(12) United States Patent  (10) Patent No.: US 8,353,997 B2
Erb et al.  (45) Date of Patent: Jan. 15, 2013

(54) METHOD FOR PRODUCING A COMPONENT FROM A FIBER-REINFORCED MATERIAL

(75) Inventors: Thiemo Erb, Stuttgart (DE); Lambert Feher, Stutensee (DE)

(73) Assignees: Dr. Ing. h.c.F. Porsche Aktiengessellschaft (DE); Karlsruher Institut Fuer Technologie (DE)

( * ) Notice: Subject to any disclaimer, the term of this patent is extended or adjusted under 35 U.S.C. 154(b) by 0 days.

(21) Appl. No.: 13/509,499

(22) PCT Filed: Oct. 23, 2010

(86) PCT No.: PCT/EP2010/006494
§ 371 (c)(1),
(2), (4) Date: Jun. 19, 2012

(87) PCT Pub. No.: WO2011/057712
PCT Pub. Date: May 19, 2011

(65) Prior Publication Data
US 2012/0247655 A1    Oct. 4, 2012

(30) Foreign Application Priority Data
Nov. 13, 2009 (DE) .................. 10 2009 052 835

(51) Int. Cl.
*B29C 70/44* (2006.01)
(52) U.S. Cl. ........................................ 156/245
(58) Field of Classification Search .............. 156/245
See application file for complete search history.

(56) References Cited

U.S. PATENT DOCUMENTS

| 4,622,091 | A   | * | 11/1986 | Letterman ................. 156/286 |
| 6,843,953 | B2  | * | 1/2005  | Filsinger et al. ............. 264/510 |
| 2005/0279481 | A1 | * | 12/2005 | Renkel et al. ................ 164/114 |
| 2008/0121263 | A1 |   | 5/2008  | Schutte et al. |
| 2008/0241455 | A1 | * | 10/2008 | DiNello et al. ............. 428/58 |

FOREIGN PATENT DOCUMENTS

| DE | 100 13 409   | 11/2000 |
| DE | 103 26 021   | 12/2004 |
| JP | 2-182438     | 7/1990  |
| WO | 2008/061823  | 5/2008  |

OTHER PUBLICATIONS

English translation of the International Preliminary Report on Patentability.

* cited by examiner

*Primary Examiner* — Philip Tucker
*Assistant Examiner* — Vicki Wu
(74) *Attorney, Agent, or Firm* — Gerald E. Hespos; Michael J. Porco

(57) ABSTRACT

The invention relates a method for producing a component from a fiber-reinforced material, wherein a fibrous preform which consists of fibers and an uncured polymer matrix is positioned on a mold, and a thermoelectric film is positioned on the fibrous preform and/or on the mold, and said thermoelectric film is heated up by exposure to microwaves when a negative pressure or vacuum is applied and, as a consequence of this, heats up the fibrous preform while curing the polymer matrix.

11 Claims, 2 Drawing Sheets

METHOD FOR PRODUCING A COMPONENT FROM A FIBER-REINFORCED MATERIAL

BACKGROUND OF THE INVENTION

1. Field of the Invention

The invention relates a method for producing a component from a fiber-reinforced material.

2. Description of the Related Art

DE 103 26 021 A1 discloses a method for producing a component from a fiber-reinforced material in which a fibrous preform is positioned on a mold, the fibrous preform being covered and sealed off outwardly with respect to the mold by a vacuum film. Positioned between the fibrous preform and the vacuum film there is on the one hand a distributing fabric and on the other hand a separating film, the separating film being positioned between the distributing fabric and the fibrous preform and the distributing fabric being positioned between the vacuum film and the separating film. According to DE 103 26 021 A1, liquid resin for impregnating the fibrous preform, to be specific by means of exposure to negative pressure, is fed to the fibrous preform by way of the distributing fabric.

On this basis, the present invention addresses the problem of providing a novel method for producing a component from a fiber-reinforced material. In the case of the method according to the invention for producing a component from a fiber-reinforced material, a fibrous preform which consists of fibers and an uncured polymer matrix is positioned on a mold, a thermoelectric film is positioned on the fibrous preform and/or on the mold, and said thermoelectric film is heated up by exposure to microwaves when a negative pressure or vacuum is applied and, as a consequence of this, heats up the fibrous preform while curing the polymer matrix.

With this present invention, a completely novel method for producing a component from a fiber-reinforced material is proposed. By the method according to the invention, a preform which consists of fibers and an uncured polymer matrix is used as the fibrous preform. With the aid of the thermoelectric film which is positioned on the fibrous preform and/or on the mold, the fibrous preform is heated up while curing the polymer matrix of the fibrous preform, the thermoelectric film that serves for heating up the fibrous preform for the curing being heated up by exposure to microwaves when a negative pressure or vacuum is applied.

SUMMARY OF THE INVENTION

For the purposes of the invention, a thermoelectric film is accordingly a film which has a thermal effect, that is to say gives off heat, when induced to do so by exposure to microwaves, and accordingly by way of an electromagnetic coupling to microwave radiation. For the purposes of the invention, electrical energy can accordingly be introduced into a thermoelectric film by exposure to microwaves, and said electrical energy is converted by the thermoelectric film into thermal energy and given off as heat.

Such a method for producing a component from a fiber-reinforced material provides a completely novel procedure by which fiber-reinforced components can be produced particularly easily and reliably with high quality.

A segmented thermoelectric film, which is heated up by the exposure to microwaves exclusively in the region of defined first segments, whereas the same is not heated up by the exposure to microwaves in the region of defined second segments, is preferably used as the thermoelectric film.

Whenever such a segmented, thermoelectric film is used as the thermoelectric film, specific heating up of the fibrous preform can take place in geometrically defined regions. This allows selective properties to be produced at defined, geometrical regions of the fibrous preform, and consequently of the later component. Furthermore, local overheating of the fibrous preform during the exposure to microwaves can be avoided.

According to a first advantageous development of the invention, the thermoelectric film additionally acts as a vacuum film, which is sealed off with respect to the mold in such a way that a negative pressure or a vacuum can be set between the mold and the thermoelectric film, a negative pressure or a vacuum being set between the mold and the thermoelectric film for the curing of the polymer matrix of the fibrous preform by way of the exposure to microwaves.

According to a second, alternative advantageous development of the invention, a separate vacuum film is used in addition to the thermoelectric film and is sealed off with respect to the mold in such a way that a negative pressure or a vacuum can be set between the mold and the vacuum film, and a negative pressure or a vacuum is set between the mold and the vacuum film for the curing of the polymer matrix of the fibrous preform by way of the exposure to microwaves.

Whenever the first advantageous development of the invention is used, it is possible to dispense with a separate vacuum film, since then the thermoelectric film additionally acts as a vacuum film. In this case, the method can be simplified and made more economical.

Preferred developments of the invention are provided by the dependent claims and the description which follows. Exemplary embodiments of the invention are explained in more detail on the basis of the drawing without being restricted thereto.

DETAILED DESCRIPTION OF THE PREFERRED EMBODIMENTS

The present invention in this case relates to a method for producing a component from a fiber-reinforced material, for example from a carbon-fiber-reinforced or glass-fiber-reinforced material.

According to the invention, a fibrous preform which consists of fibers and an uncured polymer matrix, in particular an uncured, thermosetting polymer matrix, is positioned on a mold, a thermoelectric film being positioned on the fibrous preform and/or on the mold. This arrangement is exposed to microwaves when a negative pressure or vacuum is applied, the thermoelectric film heating up as a consequence of the exposure to microwaves, in order in this way to heat up the fibrous preform while curing the polymer matrix.

Whenever the fibrous preform comprises continuous fibers, the fibrous preform is also referred to as a prepreg. By contrast, whenever the fibrous preform comprises shorter fibers, the same is referred to as a BMC (Bulk Molding Compound) or as an SMC (Sheet Molding Compound).

As already mentioned, the fibers of the fibrous preform may be glass fibers or carbon fibers or alternatively also aramid fibers. The polymer matrix of the fibrous preform is preferably based on an epoxy resin or vinyl ester.

It is accordingly in keeping with the purposes of this present invention to produce a component from a fiber-reinforced material by a fibrous preform of fibers embedded in an uncured polymer matrix being cured by way of exposure to microwaves, for which purpose the thermoelectric film which is positioned either on the fibrous preform or on the mold is heated up by exposure to microwaves, the thermoelectric film thus heated up by exposure to microwaves then heating up the polymer matrix to be cured of the fibrous preform while curing the polymer matrix.

For the purposes of the invention, a thermoelectric film is accordingly a film which has a thermal effect, that is to say gives off heat, when induced to do so by exposure to microwaves, and accordingly by way of an electromagnetic coupling to the microwave exposure. For the purposes of the invention, electrical energy can accordingly be introduced into a thermoelectric film by exposure to microwaves, and said electrical energy is converted by the thermoelectric film into thermal energy and given off as heat.

Details of the method according to the invention are described below with reference to the exemplary embodiments of FIGS. 1 to 5.

Figure 1:
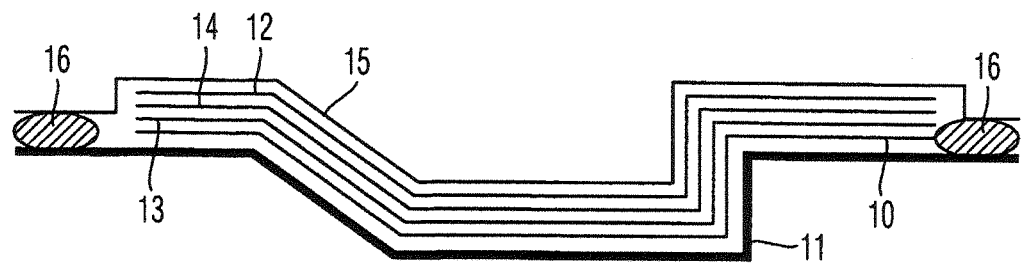
FIG. 1 shows a schematic side view of an arrangement to illustrate a first exemplary embodiment of a method according to the invention for producing a component from a fiber-reinforced material.

FIG. 1 illustrates a first exemplary embodiment of the method according to the invention for producing a component from a fiber-reinforced material. According to the exemplary embodiment of FIG. 1, a fibrous preform 10 is positioned on a first side of a mold 11, in FIG. 1 a thermoelectric film 12 being positioned on the fibrous preform 10, to be specific while interposing a separating film 13 and a nonwoven 14 between the fibrous preform 10 and the thermoelectric film 12.

The separating film 13 has the effect of preventing during the curing of the polymer matrix of the fibrous preform 10 the nonwoven 14 from adhesively bonding thereto. It is possible by way of the nonwoven 14 to remove air from the region of the fibrous preform 10 to apply a negative pressure or vacuum.

In the exemplary embodiment of FIG. 1, a separate vacuum film 15 is used for providing the negative pressure or the vacuum and is sealed off with respect to the mold 11 at a peripheral region 16 in such a way that a vacuum or a negative pressure can be set between the mold 10 and the vacuum film 15, and consequently in the region of the fibrous preform 10, for the curing of the polymer matrix of the fibrous preform 10. According to FIG. 1, the vacuum film 15 is thereby positioned directly on the thermoelectric film 12, the thermoelectric film 12 being positioned between the vacuum film 15 and the fibrous preform 10, to be specific in FIG. 1 between the vacuum film 15 and the nonwoven 14.

Figure 2:
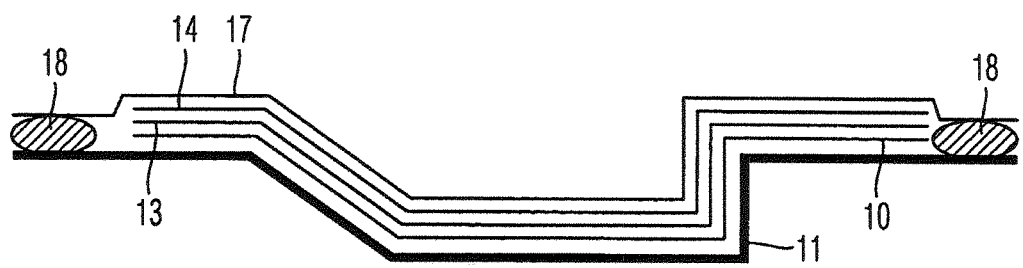
FIG. 2 shows a schematic side view of an arrangement to illustrate a second exemplary embodiment of a method according to the invention for producing a component from a fiber-reinforced material.

FIG. 2 illustrates a second embodiment of the invention, which dispenses with a separate vacuum film, a thermoelectric film 17 that acts at the same time or in addition as a vacuum film being used in the exemplary embodiment of FIG. 2.

According to FIG. 2, the thermoelectric film 17 also acting as a vacuum film is sealed off with respect to the mold 11 at a peripheral region 18 of the same, so that a negative pressure or a vacuum can be set between the mold 11 and the thermoelectric film 17, and consequently in the region of the fibrous preform 10, for the curing of the polymer matrix. In the embodiment of FIG. 2, the separating film 13 and the nonwoven 14 are in turn positioned between the thermoelectric film 17 and the fibrous preform 10.

Figure 3:
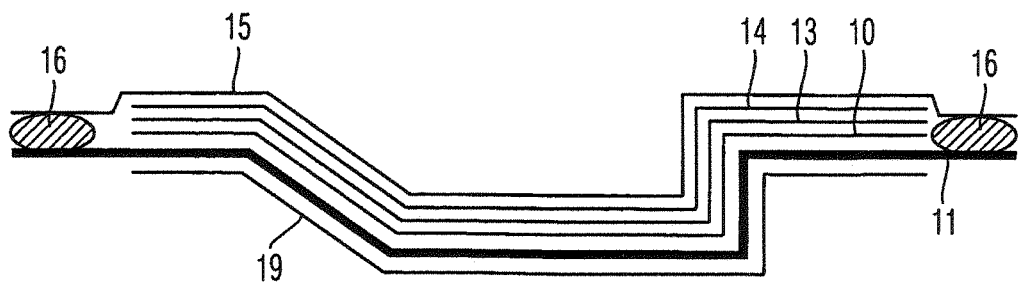
FIG. 3 shows a schematic side view of an arrangement to illustrate a third exemplary embodiment of a method according to the invention for producing a component from a fiber-reinforced material.

FIG. 3 shows a further embodiment of the method according to the invention for producing a component from a fiber-reinforced material. In the exemplary embodiment of FIG. 3, a separate vacuum film 15 is in turn used, sealed off at peripheral regions 16 of the same with respect to the mold 11, the fibrous preform 10, the separating film 13 and the nonwoven 14 being positioned between the separate vacuum film 15 and the mold 11, to be specific in such a way that the fibrous preform 10 is positioned on the first side of the mold 11, the separating film 13 is positioned on the fibrous preform 10 and the nonwoven 14 is positioned on the separating film 13, with the vacuum film 15 adjoining the nonwoven 14 on the outside.

In the exemplary embodiment of FIG. 3, a thermoelectric film 19 is not positioned on the fibrous preform 10, but rather on the mold 11, to be specific on a second side of the same, which is opposite from the first side of the mold 11 and is consequently facing away from the fibrous preform 10. In the configurational variant of FIG. 3, the thermoelectric film 19 is in turn heated up by exposure to microwaves, and then heats up the mold 11 and, by way of the mold 11, heats up the fibrous preform 10 for the curing of the polymer matrix of the fibrous preform 10.

In this case, the thermoelectric film 19 may be permanently connected to the mold 11, for example by adhesive bonding or by vulcanizing.

A further alternative of the invention is obtained by the exemplary embodiments of FIGS. 2 and 3 being combined with one another, that is to say dispensing with the separate vacuum film 15 in FIG. 3.

In this variant, the thermoelectric film 19 then also extends on the first side of the mold 11 and accordingly surrounds the mold 11 on all sides, so that a negative pressure or vacuum can then be set between the thermoelectric film 19 and the mold 11 for the curing of the polymer matrix of the fibrous preform 10.

Figure 4:
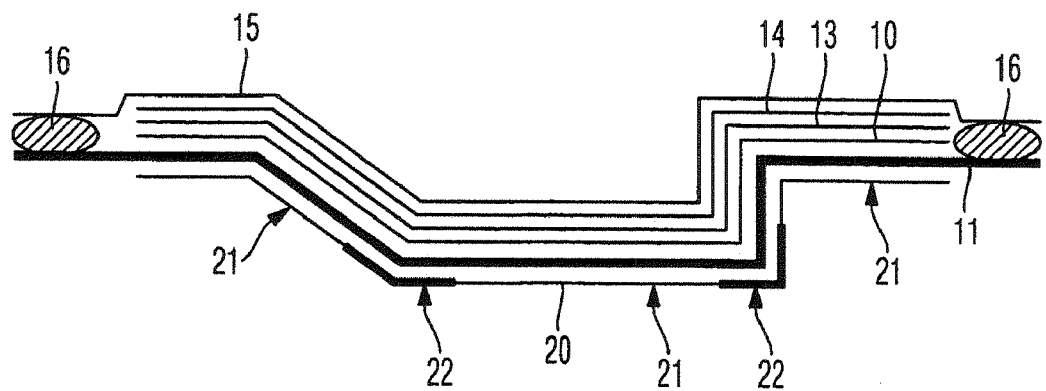
FIG. 4 shows a schematic side view of an arrangement to illustrate a fourth exemplary embodiment of a method according to the invention for producing a component from a fiber-reinforced material.

On the basis of the embodiment of FIG. 3, FIG. 4 depicts a further variant of the invention. Thus, in the case of the exemplary embodiment of FIG. 4, a thermoelectric film 20 that is segmented is used, it being possible for the segmented, thermoelectric film 20 to be heated up by exposure to microwaves in first segments 21 and not heated up by exposure to microwaves in second segments 22. The second segments 22 of the thermoelectric film 20 then preferably serve exclusively for conducting the heat.

In this case it is possible for curing the polymer matrix of the fibrous preform 10 to expose the same to different heating in defined regions than in other defined regions, in order in this way to produce defined properties of the component to be produced or to avoid local overheating of the fibrous preform 10 during the curing.

Figure 5:
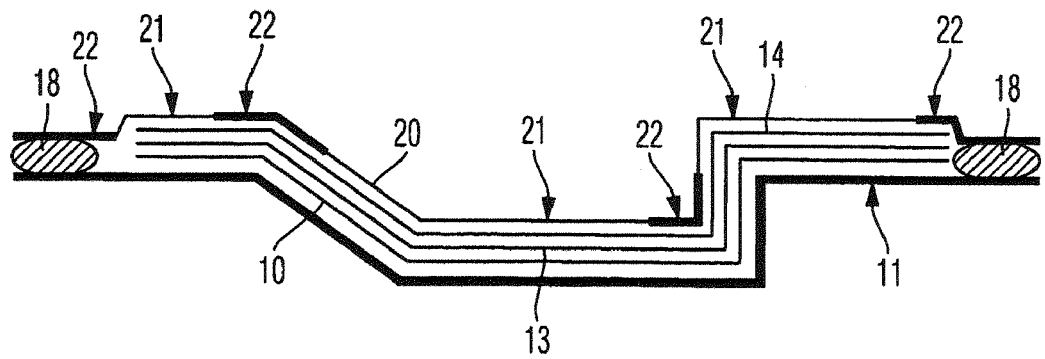
FIG. 5 shows a schematic side view of an arrangement to illustrate a method for producing a component from a fiber-reinforced material in accordance with a variant of the embodiment shown in FIG. 4.

FIG. 5 shows a variant of the invention in which, as a difference from FIG. 4, a segmented, thermoelectric film 20 with the first segments 21 that can be heated up by exposure to microwaves and the second segments 22 that cannot be heated up by the exposure to microwaves not being applied to the mold 11 in the region of the second side but instead, in the same way as in the case of the exemplary embodiment of FIG. 2, on the first side, and consequently on the fibrous preform 10 while interposing the separating film 13 and the nonwoven 14.

It should be pointed out that the separating film 13 and the nonwoven 14 are optional subassemblies. It is thus possible to position a film that assumes both the function of the separating film 13 and the function of the nonwoven 14 between the fibrous preform 10 and the thermoelectric film 12, 17 or 20, or between the fibrous preform 10 and the separate vacuum film 15, in place of the separating film 13 and the nonwoven 14.

Furthermore, the function of the separating film 13 and of the nonwoven 14 may also be assumed directly by the thermoelectric film 12, 17 or 20 or by the separate vacuum film 15, so that it is then possible to dispense completely with a separate separating film 13 and a separate nonwoven 14.

For the microwave exposure, and consequently for the microwave curing of the polymer matrix of the fibrous preform 10, the arrangements of FIGS. 1 to 5 are preferably positioned in a microwave oven, it being possible for the power of the same to be regulated, for example by way of thermocouples introduced into the microwave oven. However, the power required for curing the polymer matrix of the fibrous preform 10 may also be empirically determined in advance, in that case not being regulated.

The thermoelectric film 12, 17, 19 or 20 that is used in connection with the method according to the invention preferably consists of a polymeric base material, preferably based on a microwave-permeable rubber or silicone. The thermoelectric film preferably has sufficient draping qualities or is pre-shaped by molding to the geometry of the component that is to be produced by the method according to the invention.

The thermoelectric film can be used as frequently as desired.

By admixing microwave-active additives into the polymeric base material of the thermoelectric film, which are preferably distributed homogeneously in the polymeric base material of the same and, in terms of their thermal heating characteristics, behave inertly with respect to the ability of the polymeric base material to form polymer chains, the entire thermoelectric film can serve as a semipermeable consumer for the microwave radiation, in order to bring about a heat input into the polymer matrix to be cured of the fibrous preform.

On the other hand, the thermoelectric film serves as an enveloping isotherm, which uniformly encloses the fibrous preform to be cured. In its set material properties, the thermoelectric film then thermally insulates the enclosed fibrous preform from the surroundings of the microwave oven and possibly acts at the same time as a vacuum film.

Since a rubber- or silicone-based polymeric base material has a relatively low thermal conductivity, the thermal conductivity of the thermoelectric film may be improved by admixing additives. Mixtures of microscale or nanoscale carbon, for example carbon black or graphite, microscale or nanoscale ferromagnetically and ferrimagnetically absorbing ion compounds, such as for example iron oxides or hydrocyclic, aromatic admixtures with microwave-active amino groups, may be used here as additives. Heat propagation by diffusion can be improved in particular by such additives. Furthermore, the behavior with respect to coupling to the microwave exposure can be improved and specifically set by way of the additives.

To form the segmented, thermoelectric film that is used in the exemplary embodiments of FIGS. 4 and 5, different additives or complementary additives may be incorporated in the polymeric base material of the same. For instance, by admixing metal powders within the thermoelectric film, a segment of the same that does not undergo microwave heating and merely serves for conducting the heat can be formed. It is accordingly made possible by the segmented incorporation of different or complementary additives to provide a thermoelectric film that has the different segments, that is to say the first segments that can be heated up when exposed to microwaves and the second segments that cannot be heated up when exposed to microwaves.

A mold of microwave-permeable, organic materials, such as for example of ceramics, concrete or cement, of composite materials, such as for example microwave-permeable glass-fiber composites, of absorbent materials, such as for example silicone hydride, or of microwave-reflective materials, such as for example aluminum or steel or magnesium or copper or Invar, may be used as the mold 11. Furthermore, a mold may be produced from a polymer, such as for example Ureol.

The invention claimed is:

1. A method for producing a component from a fiber-reinforced material, the method comprising: positioning a fibrous preform on a mold, the fibrous preform comprising fibers and an uncured polymer matrix, positioning a thermoelectric film on the fibrous preform and/or on the mold, heating said thermoelectric film by exposure to microwaves while applying a negative pressure or vacuum and, as a consequence of this, heating up the fibrous preform while curing the polymer matrix.

2. The method as claimed in claim 1, further comprising positioning the fibrous preform directly on a first side of the mold.

3. The method as claimed in claim 2, further comprising positioning the thermoelectric film directly on the fibrous preform.

4. The method as claimed in claim 2, further comprising positioning the thermoelectric film indirectly on the fibrous preform while interposing a separating film and/or a nonwoven.

5. The method as claimed in claim 4, further comprising positioning the thermoelectric film on a second side of the mold, which is opposite from the first side of the mold and is facing away from the fibrous preform.

6. The method as claimed in claim 1, wherein the thermoelectric film additionally acts as a vacuum film, which is sealed off with respect to the mold in such a way that a negative pressure or a vacuum can be set between the mold and the thermoelectric film, a negative pressure or a vacuum being set between the mold and the thermoelectric film for the curing of the polymer matrix of the fibrous preform by way of the exposure to microwaves.

7. The method as claimed in claim 1, further comprising using a separate vacuum film in addition to the thermoelectric film and sealing off the vacuum with respect to the mold in such a way that a negative pressure or a vacuum can be set between the mold and the vacuum film, and setting a negative pressure or a vacuum between the mold and the vacuum film for the curing of the polymer matrix of the fibrous preform by way of the exposure to microwaves.

8. The method as claimed in claim 7, further comprising positioning the vacuum film directly on the thermoelectric film, and positioning the thermoelectric film between the vacuum film and the mold.

9. The method as claimed in claim 7, further comprising positioning the vacuum film directly on the fibrous preform, and positioning the mold between the thermoelectric film and the vacuum film.

10. The method as claimed in claim 7, further comprising positioning the vacuum film directly on a separating film or a nonwoven, and positioning the mold being positioned between the thermoelectric film and the vacuum film.

11. The method as claimed in claim 1, wherein the thermoelectric film is a segmented thermoelectric film with at least a region of defined first segments and a region of defined second segments, which is heated up by the exposure to microwaves exclusively in the region of defined first segments, whereas the segmented thermoelectric film is not heated up by the exposure to microwaves in the region of defined second segments.

* * * * *